United States Patent [19]

Bergan et al.

[11] Patent Number: 4,734,600

[45] Date of Patent: Mar. 29, 1988

[54] NOISE DAMPED DYNAMO ELECTRIC MACHINE, ESPECIALLY VEHICULAR TYPE ALTERNATOR

[75] Inventors: Günther Bergan, Ludwigsburg; Manfred Frister, Schwieberdingen; Gerhard Henneberger, Möglingen; Peter Lack, Bietigheim-Bissingen; Stefan Renner, Weissach-Flacht, all of Fed. Rep. of Germany

[73] Assignee: Robert Bosch GmbH, Stuttgart, Fed. Rep. of Germany

[21] Appl. No.: 936,278

[22] Filed: Dec. 1, 1986

[30] Foreign Application Priority Data

Dec. 10, 1985 [DE] Fed. Rep. of Germany ....... 3543544

[51] Int. Cl.⁴ .......................... H02K 5/24; H02K 9/00
[52] U.S. Cl. .......................................... 310/51; 310/62
[58] Field of Search ................ 310/51, 52, 62, 63, 310/66, 67 R

[56] References Cited

U.S. PATENT DOCUMENTS

| 2,674,897 | 4/1954 | Heinish | 310/51 UX |
| 3,555,317 | 1/1971 | Allan | 310/62 X |
| 4,540,381 | 9/1985 | Molloy et al. | 310/62 X |
| 4,564,775 | 1/1986 | Mazzorana | 310/62 |

FOREIGN PATENT DOCUMENTS

| 2800973 | 7/1979 | Fed. Rep. of Germany | 310/51 |
| 2839288 | 3/1980 | Fed. Rep. of Germany | |

Primary Examiner—Mark O. Budd
Attorney, Agent, or Firm—Frishauf, Holtz, Goodman & Woodward

[57] ABSTRACT

In an apparatus for noise reduction and damping in ventilators of electric machines, in particular vehicular alternators, it is proposed that the ventilator support on the rotor shaft be effected by axially staggering inner rubber inlays on both sides and providing adjoining outer spring pressure elements such that the ventilator region is clamped, at least in the axial direction and preferably radially as well with an additional rubber ring. As a result, the transfer of resonant vibrations of the rotor to the ventilator are reliably avoided, and the noise emissions are decisively reduced.

20 Claims, 13 Drawing Figures

NOISE DAMPED DYNAMO ELECTRIC MACHINE, ESPECIALLY VEHICULAR TYPE ALTERNATOR

Reference to related publication, assigned to the Assignee of the present invention: German Patent Disclosure Document No. DE-OS 28 39 288, DOBLER and HACHTEL.

The present invention relates to dynamo electric machines, and more particularly to alternators adapted to be installed in vehicles, for example, passenger automobiles, trucks, buses, railroad and light rail vehicle cars, or other types of vehicles and especially to an arrangement to prevent noise peaks during operation of the alternator at selected speeds.

BACKGROUND

It is known that ventilators or fans coupled to electric machinery emit a substantial amount of noise. This is so particularly for three-phase alternators for vehicular use. It has been proposed to dampen the noise level of a ventilator or fan of a three-phase alternator by a rubber bearing - see the reference in German Patent Disclosure Document No. DE-OS 28 39 288, assigned to the Assignee of the present application.

In this known bearing, the elastomer or rubber forms a direct bearing means. In other words, the ventilator or fan is supported via an intermediate rubber part; with a generally rigid fastening, for example, either a rubber gasket is fastened in between, or rubber separators are located on both sides in the radial or axial direction, as part of the fan bearing itself, for example. Bearing a fan directly in this way via an interposed, optionally annular rubber element enables a shift in the resonance of the fan, thus damping noise development at selected speed ranges. Tests have shown that the noise emitted by fans and ventilators correlates closely with the resonant frequencies, such as torsion vibration and the like, of the rotor structure of the generator involved.

THE INVENTION

It is an object to provide a coupling to a fan or ventilator associated with a dynamo electric machine, typically a three-phase vehicular alternator, which is so constructed that, as the speed of the rotor structure of the dynamo electric machine changes, the ventilator or fan will not be excited at resonant frequencies to noise level peaks; and in which, likewise, resonance phenomena derived from the fan will not be transmitted to the rotor structure of the dynamo electric machine, so that, overall, the dynamo electric machine will have a lower noise level than heretofore, and especially will not exhibit noise peaks at certain speeds.

Briefly, the ventilator is constructed as a ventilator wheel which has two oppositely located side surfaces. The ventilator wheel is secured to the rotor shaft by an arrangement which attenuates noise generation. This attachment arrangement provides an axial clamping system, axially clamping the ventilator wheel to the rotor shaft. The axial clamping system has, in axially staggered position, a material which is elastically pressure transferring while damping vibration transferred thereto. This material is located immediately adjacent the ventilator wheel and engages a portion of at least one of the side surfaces of the ventilator wheel; in a preferred form, both side surfaces of the ventilator wheel have this material, which may be in disk or ring form, located thereagainst. To clamp the elastically pressure transferring material against the wheel, a spring pressure element is seated on the shaft. A counter element which may be another group of a spring pressure element and the pressure transferring material, accepts the clamping pressure. The ventilator wheel is thus held on the shaft in an axially defined position, being clamped between the respective elements with the elastic pressure transferring material interposed between the spring pressure element and the ventilator wheel.

The elastic pressure transferring element may be rubber, or another elastomer having similar characteristics. The spring pressure element may, for example, be a disk- or washer-like spring, or cup spring.

The arrangement has the advantage that the use of two different materials, axially staggered, effectively prevents resonant noise peaks from arising. One of the clamping elements has an elastic resilient pressure effect, providing axial clamping; the other has an elastic resilient clamping effect and additionally a damping effect on the ventilator wheel against which it is clamped. The combination results in suppression of resonant frequency conditions of the attachment arrangement for the ventilator wheel, as well as overall noise damping. In the main speed ranges of the dynamo electric machine, thus, resonant noise peaks are eliminated, so that, overall, the noise level during operation of the machine is reduced.

The symmetrical bearing of the ventilator via metal spring washers on both sides and elastomer washers interposed on both sides, which are also the only means that fix and clamp the ventilator in the axial direction, is particularly advantageous. With this kind of bearing, the transfer of disruptive resonant frequencies to the ventilator is already effectively prevented, and the intervening layers of damping rubber, because of the internal friction they produce, again damp and hinder a possible generation of resonant ventilator vibration. The invention accordingly assures a practically complete damping of the noise emitted by ventilators in three-phase alternators or electric machines in general. The damped ventilator system arrangement according to the invention can be incorporated into the existing design for three-phase alternators without requiring any changes, except in the bearing area for the ventilator.

The invention is particularly advantageous when plastic ventilators are used, which as tests have shown tend to emit even more noise, contrary to what would generally be expected, when clamped in the conventional way, presumably because by reason of their inherent elasticity they are additionally capable of reacting to harmonics of stimulating resonant frequencies.

A further advantage of the present invention is that even in the event of possible aging or other destruction of the rubber, perhaps due to general wear, the ventilator nevertheless remains axially fixed and clamped in a completely secure and vibration-free manner in any event, because of the residual elastic resilient pressure effect of the second material, which may form a spring washer or a disk spring.

The basic concept of the present invention is that the radial structure of the ventilators, which is wheel-like in form, with axial ventilator blades mounted on the outer end region, is clamped in such a way to the shaft supporting the rotor of the generator system that this clamping is effected on at least one side and preferably on both sides symmetrically in the axial layers, first via rubber inlays and then via spring washers, which are compressed together such that pressure is axially exerted by the spring washers via the rubber inlays upon both of the clamped ring-shaped ventilator side surfaces, In other words, there is a first elastically resilient and simultaneously damping material, which may be an elastomer, a rubber, or the like, which is joined in succession, in terms both of the order of the axial layers and of the resultant pressure effect, with a second material, which is a solely elastically resilient material and so exerts the actual clamping action, brought to bear on both sides by spring washers, which may be embodied as plate springs.

A further feature of the invention assures that in the axial direction at least, the clamped ring-shaped rotor side surface does not at any point touch or rest on a rigid, that is, metal, part, so that the transfer of vibration and resonant frequencies of the rotor system, which may arise from torsional vibration, is already effectively hindered at this point.

DRAWING

Figure 9:
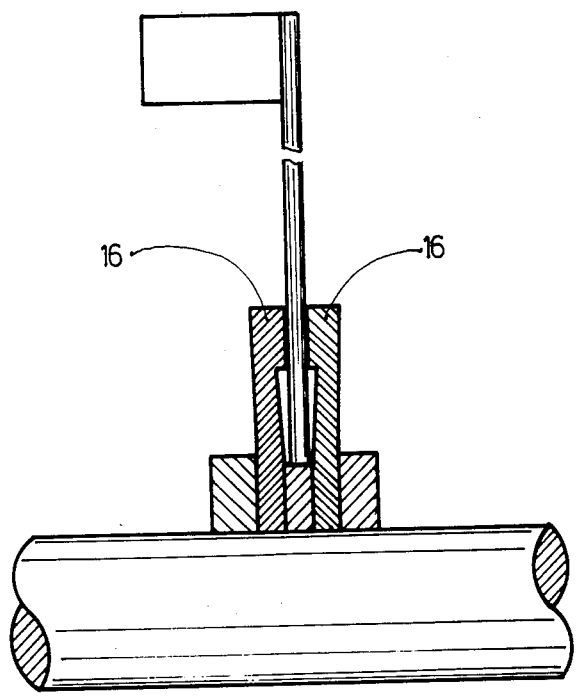
Figure 10:
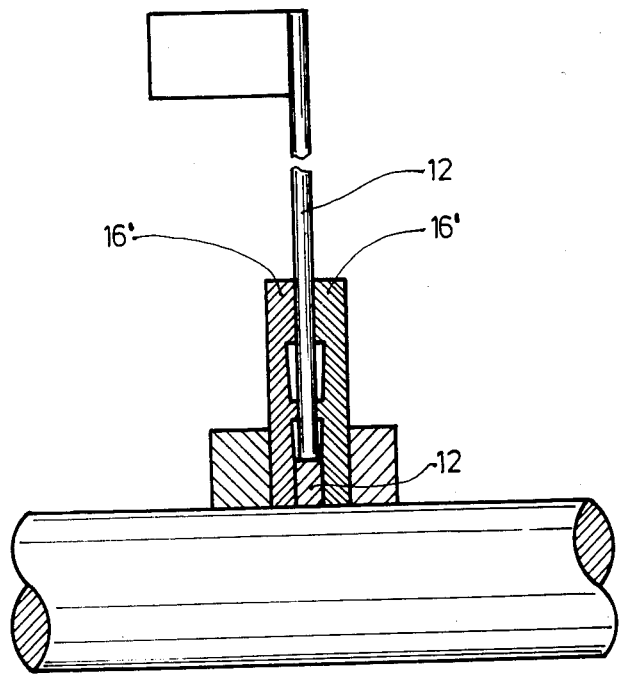
Figure 11:
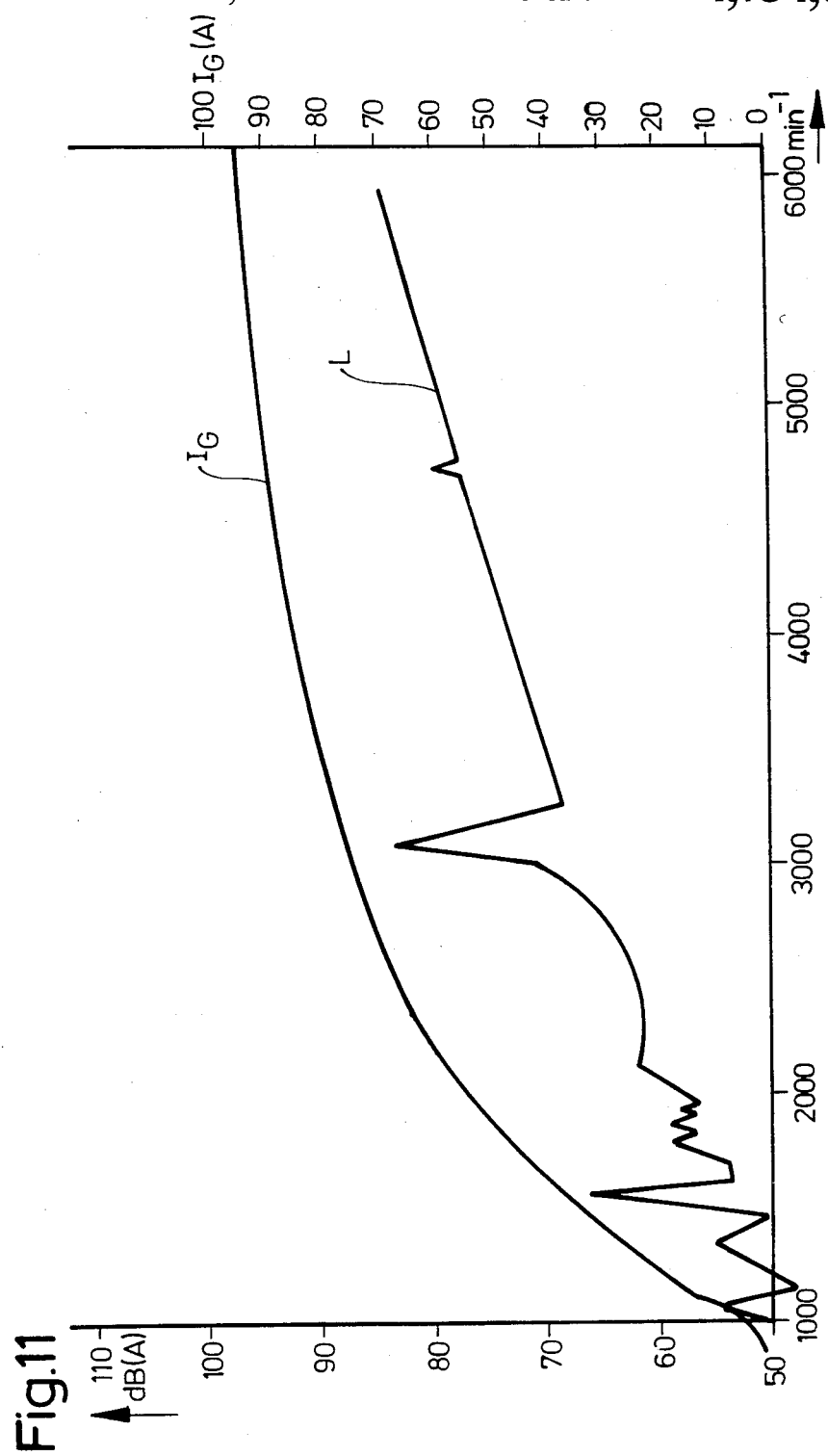
Figure 12:
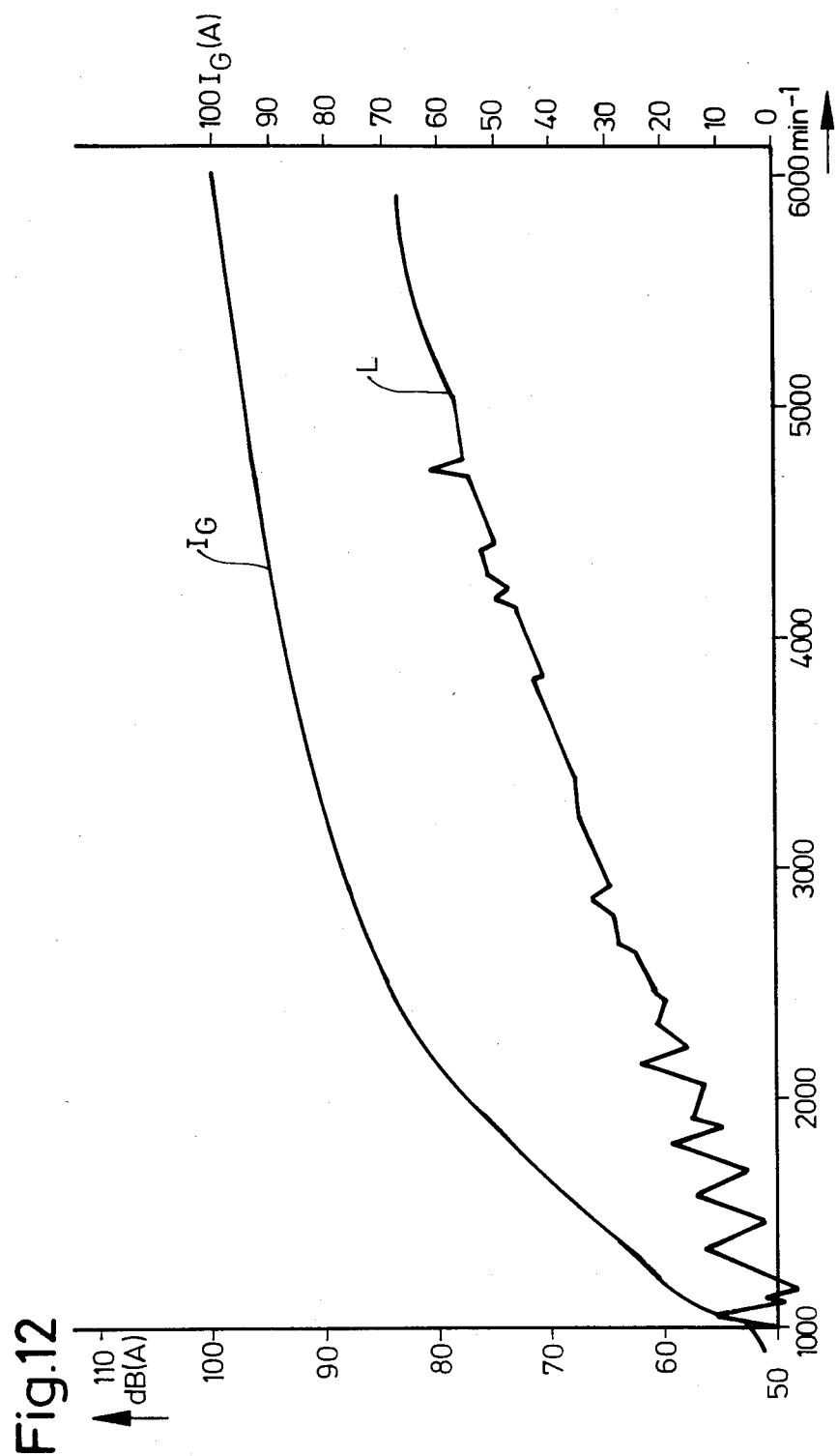

FIGS. 9 and 10, for descriptive purposes, show embodiments of the damped ventilator system in which the rubber ring inlays have become worn, thus showing that even then a secure axial fixation of the ventilator is attained;

FIG. 11 is a diagram showing the course of noise level measurements plotted over the generator speed for a conventional ventilator fastening; and FIG. 12 is a diagram showing the course of noise level measurements plotted over the generator speed for a damped ventilator system corresponding to the provisions of the present invention.

DETAILED DESCRIPTION

Figure 1:
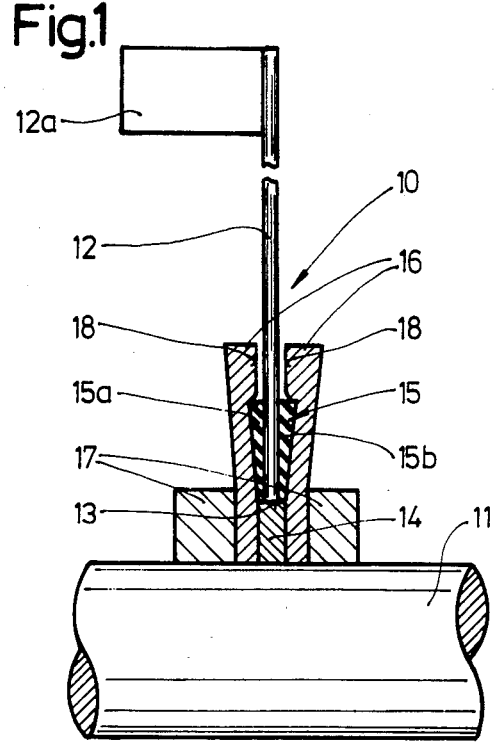
FIG. 1 shows a first exemplary embodiment of a ventilator system clamped in a damping manner in accordance with the present invention.

In the exemplary embodiment of FIG. 1, the ventilator or fan system, or combination, is indicated at 10; it is seated on the driving shaft 11, which may also be a shaft butt and which is a conventional alternator for motor vehicles or the like simultaneously supports the rotor system as well. The general structure of an alternator of this kind is well known and need not be described in detail here, since the subject of the invention relates solely to the design and bearing of a damped ventilator or fan combination or system.

Because the ventilator system is generally rotationally symmetrical, only the upper portion of the ventilator system is shown in section in FIG. 1 as well as in the other drawing figures. This portion comprises the ventilator 12 itself, with individual ventilator blades 12a suitably distributed over its circumference. The ventilator 12 takes the general form of an annular disk or wheel, with a central inner bore 13 with which it is seated on a bushing or sleeve 14 that immediately surrounds the shaft 11. The bushing 14 may be round or non-round on its outer circumference; for example, it may be square or hexagonal, and the ventilator bore is correspondingly complementary in shape, so that it is a means of protection against unintentional rotation.

Figure 1A:
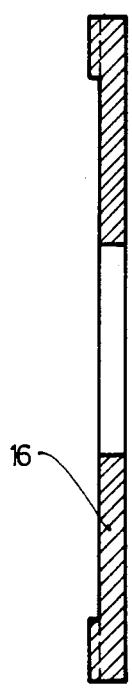
FIG. 1a is a cross-sectional view of one of the spring washers used.

Preferably on both sides, the following elements adjoin the ring-shaped ventilator side surfaces facing them, in order from inside out in the axial layers: first, rubber inlays 15, which are kept in their position and are held and pressed against the ring-shaped ventilator side surface facing them by second spring elements adjoining them on both sides. One of these spring elements, which in the exemplary embodiment shown are spring washers 16, is shown in the complete cross-sectional view provided in FIG. 1a.

The structure of the damped ventilator system is completed by two supporting disks 17 of lesser diameter, which rest on the outside of the spring washers 16 that are provided on both sides and keep the system firmly axially pressed on the shaft 11.

The axial width of the bushing 14 is preferably markedly larger than the thickness of the ventilator wheel, in any event at the clamping location, to assure that even with firm axial pressure, no metal parts can contact the clamped ring-shaped ventilator side surface in the axial direction. The transitional ring-shaped surface in the radial direction from the bore 13 to the bushing 14 is quite small, and is preferably not formed as a flush press fit. If desired, a closed rubber ring form can also be put in place at this location; this will be described more fully below.

The spring washers 16 that in the normally relaxed state press on both sides have a surface that extends radially in a straight line or in other words is plane, and may optionally even be pre-stressed toward the inside; hence, if clamping is effected flush over the width of the bushing 14, then when compression is exerted on both sides via the elastomer inlays 15, the result necessarily is an expansion effected under spring pressure, or in other words an axial enlargement of the outer circumference of the spring washers on both sides, with a gradual transition. Continuous pressure is therefore exerted upon the interposed rubber inlays 16 and finally upon the clamped ring surfaces of the rotor sides, because the spring washers on both sides, which may preferably be formed as cup or disk springs and are capable of exerting considerable pressure forces, have the tendency of striving to recover their original shape.

In the exemplary embodiment shown in FIG. 1, the actual rubber inlays 15 are in the form of fully circular rubber or elastomer rings extending in the radial direction over the entire clamped ring surface of the rotor; although only the word rubber, as in the term rubber gasket, will be used below, it is understood that this is not intended to be restrictive.

Since the spring washers on both sides gradually become larger beginning at the clamping region formed by the supporting disks 17 and extending radially outward, and hence are spaced increasingly far apart from the clamped ring-shaped side surface of the ventilator, which is dictated by the clamping, it is advantageous for the rubber gaskets 15a and 15b to be conically tapered toward the middle from the outset, that is, in the relaxed state as well; this assures that in accordance with the given physical characteristics they will be in contact with the clamped ring-shaped side surface of the rotor over their entire surface area.

The two spring washers 16 have inwardly protruding retainer stubs 18 on their outer circumference, which in the normal clamped position of the ventilator system are kept spaced apart from the associated ventilator ring surface by the spacing action of the rubber gaskets 15a, 15b on both sides; under particular conditions, however (to be described more fully in conjunction with FIGS. 9 and 10), they can also rest on the associated regions of the ring-shaped ventilator side surface. By means of the retainer stub 18, the rubber gaskets are securely retained in the annular portions, which thus form recesses, of the spring washers 16.

In the exemplary embodiments described in the following drawing figures, the same reference numerals are used for identical elements having the same function; if there are only slight differences, then the reference numerals are provided with a prime.

Figure 2:
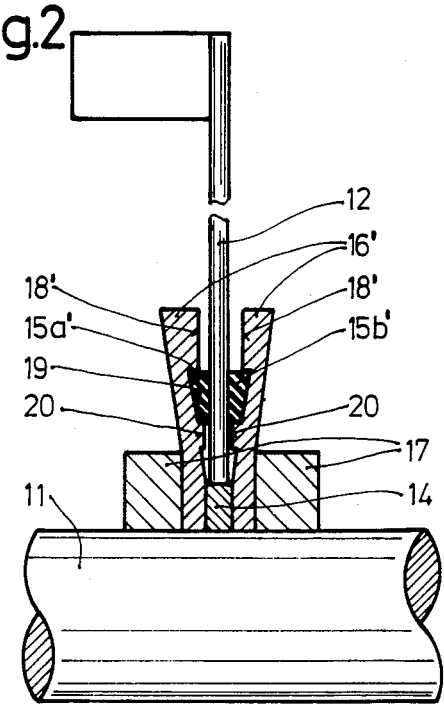
FIG. 2 shows a further exemplary embodiment, in which the elastomer material comprises rubber damping rings on both sides, supported in grooves of the spring material.

In the exemplary embodiment of FIG. 2, the radial extension of the rubber gaskets 15a, 15b' on both sides is less, and they are located in inner annular receiving grooves 19 of the spring washers 16', but here it is also assured that the inwardly protruding ring surfaces of the spring washers, which do not exert any pressure via the intervening rubber inlays on the associated ring-shaped surfaces of the rotor, are kept spaced apart from them. Because of the formation of inner annular grooves on the spring washers 16' on both sides, respective upper retainer stubs 18' and middle retainer stubs 20 oriented toward the associated ring-shaped rotor surface are formed, which between them naturally enclose the annular groove so formed.

Figure 3:
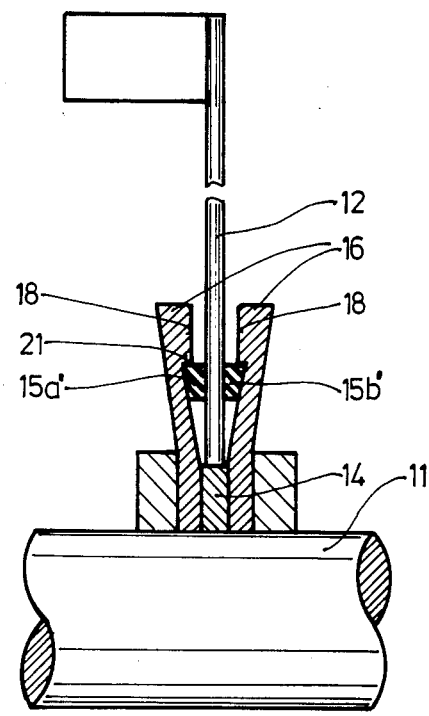
FIG. 3 shows another embodiment having narrow rubber damping rings on both sides.

In contrast to this, in the exemplary embodiment of FIG. 3 the rubber gaskets 15a', 15b' on both sides, which are however narrow in the radial direction, rest on inner annular shoulders 21 of the two spring washers 16, so that once again the spring washers on both sides have only upper retaining stubs 18, and the structure is approximately equivalent to the embodiment of FIG. 1, except that instead of the large circular gasket, narrow individual circular gaskets are provided.

Figure 4:
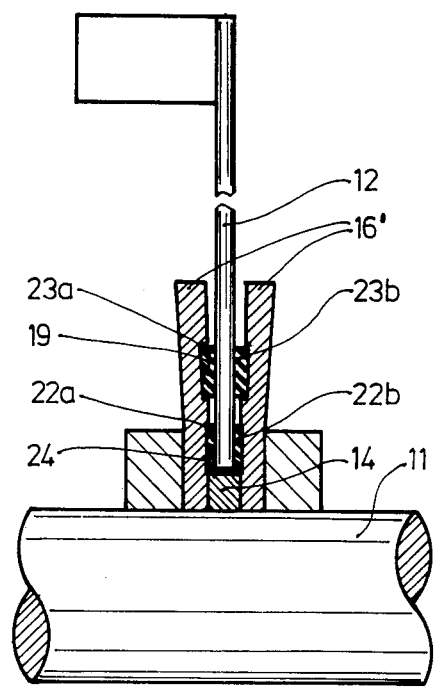
FIG. 4 shows an embodiment of a damped ventilator system, in which two damping rings are located on each side, retained in recesses or annular grooves of the spring washer.

In the exemplary embodiment of FIG. 4, two individual circular gaskets each are provided in radial layers on both sides of the ring-shaped ventilator side surface that is to be clamped; that is, there are upper and lower pairs of rubber gaskets facing one another, shown at 22a and 22b for the lower pair and 23a and 23b for the upper pair. The various individual gaskets 22a, 22b, 23a, 23b are located in suitable annular grooves receiving them, these being annular grooves 19 for the upper individual circular gaskets and 24 for the lower circular gaskets, the shape of the spring washers 16' on both sides being similar or equivalent to that of the exemplary embodiment of FIG. 2.

Figure 5:
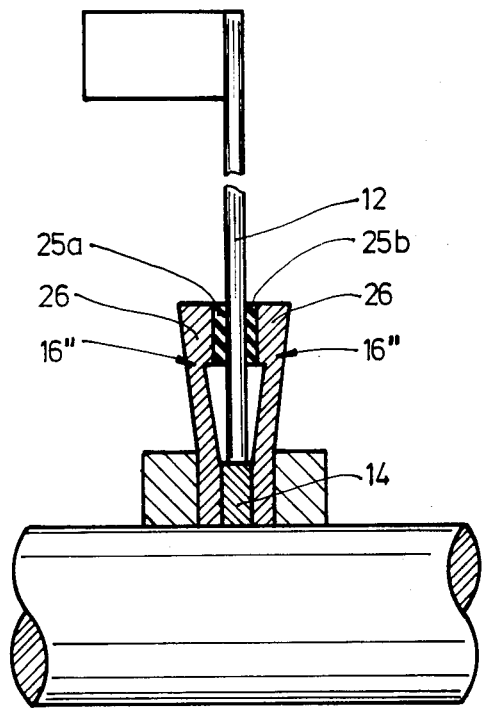
FIG. 5 shows an embodiment of a damped ventilator system, in which the damping ring forms are axially secured, for example vulcanized, onto the spring washers on both sides that form the elastically resilient material.

In the exemplary embodiment of FIG. 5, two different spring element materials, namely damping rubber on the one hand and the resilient elastic spring washers on the other, are axially layered once again but here are formed as a structural unit, in which damping rubber gaskets 25a, 25b are secured, preferebly being vulcanized on, to radially outer annular protrusions 26 of the spring washers 16" on both sides; the annular protrusions 26 are oriented inward toward the ring-shaped ventilator side surface that is to be clamped. These upper, inwardly oriented annular protrusions 26 correspond in their basic shape to the retainer stubs 18 or 18', which in the rotationally symmetrical embodiment are likewise annular in shape. In all the embodiments described thus far, it is assured in any case that in the axial direction, direct metal-to-metal contact does not occur between the ventilator wheel and the materials clamping it.

It has already been noted above that even in the basically unlikely event of wear or aging of the rubber inlays, the ventilator always continues to be absolutely firmly and securely fixed in the axial direction, because of the inwardly oriented protrusions formed by the spring washers 16, 16', 16" on both sides. These protrusions, described above as retainer ring stubs or annular protrusions, serve as guides during assembly when the rubber gaskets are put in place, and when these gaskets disappear, as shown in FIGS. 9 and 10, the come to rest directly on the associated rotor ring surfaces because of the spring action of the spring washers, so that these rotor surfaces continue to be securely retained axially and even if the rubber inlays are completely absent, there will continue to be a combination or system that still clamps the ventilator.

Figure 6:
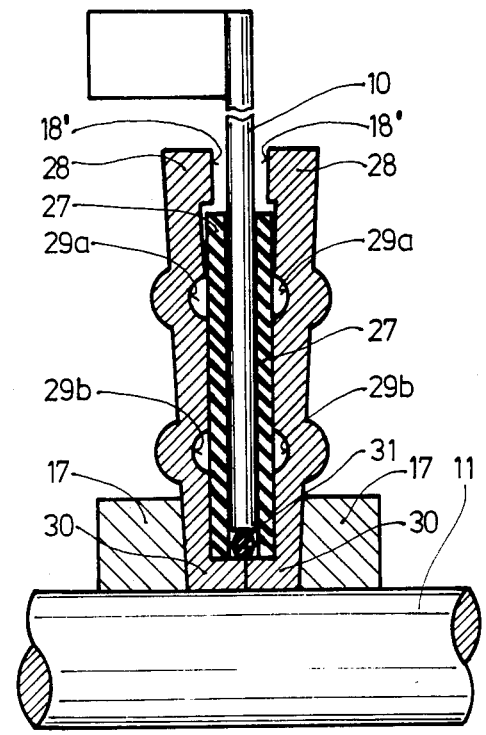
FIG. 6 shows a further embodiment having rubber gaskets on both sides and annular grooves on the inside of the spring washers.
Figure 7:
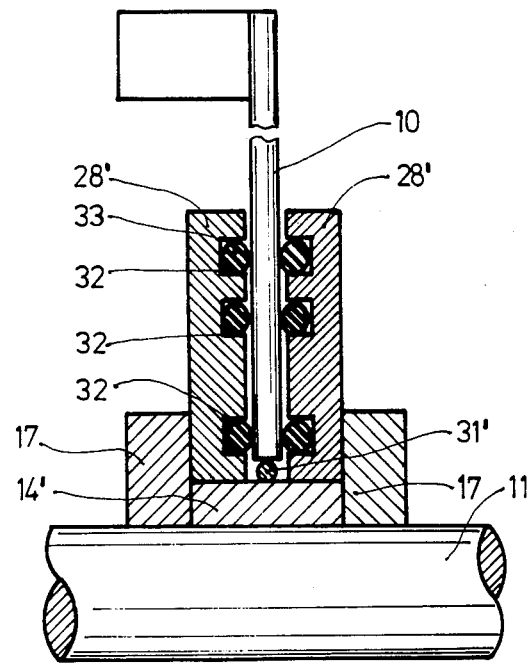
FIG. 7 shows an embodiment in which the rubber damping material or the elastomer material takes the form of O-rings placed in suitable annular recesses in the spring washers.
Figure 8:
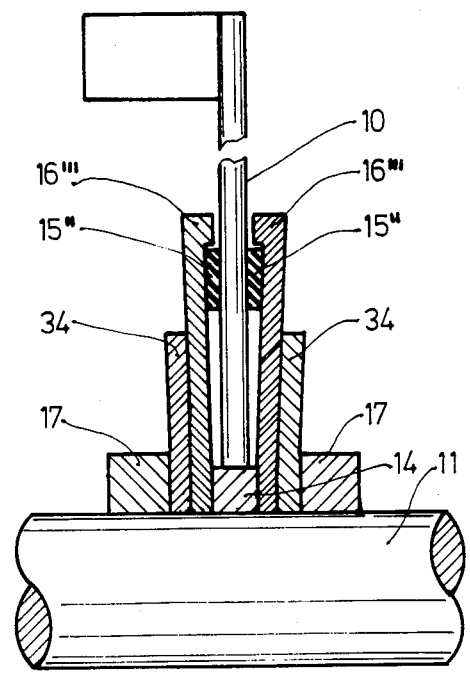
FIG. 8 shows an embodiment of a damped ventilator system having double spring washers on both sides.

Alternative embodiments for the structure of a noise damped combination ventilator system are shown in FIGS. 6-8; in FIG. 6, the ring-shaped ventilator side surface is surrounded on both sides by rubber gaskets 27 that extend radially over the entire height of the spring washers on both sides and that are located in inner generally plane recesses of the spring washers, these recesses being defined at the top by inwardly protruding retainer ring stubs 18'. Differing from the foregoing embodiments, the two spring washers 28 here are formed with grooves or notches on the inside, into which the elastomer or rubber material can escape when pressure is correspondingly exerted by the spring washers. The spring washers 28 are also bent inward in an L shape in the vicinity of the seat on the shaft, without having a separate radial bearing bushing 14 for the ventilator 10, thus forming inner annular protrusions 30 that are flush with one another and on which the bore of the ventilator 10 can rest either directly or via an interposed rubber O-ring 31. Naturally, this rubber ring may also have any other desired cross-sectional shape. The ventilator system thus formed is held together and firmly clamped on the shaft 11 by the above-mentioned supporting disks 17 on both sides.

In the exemplary embodiment of FIG. 7, a predetermined number of annular receiving grooves generally identified by reference numeral 32 and which may be rectangular or, as in the embodiment of FIG. 6, half-round, are provided in radial layers in the spring washers 28' on both sides; these washers 28' may alternatively also be seated on an intermediate bushing 14' that defines a radial spacing apart from the shaft 11 and extends in width as far as the supporting disks 17 on both sides. O-rings 33 are inserted into these annular grooves 32 on both sides, and there is an additional radial O-ring 31' between the bushing 14' and the bore of the ventilator 10, so that the ventilator 10 is retained and fixed on all sides, axially and radially, by the O rings, which are of a suitable elastomer material or rubber. Here again, the spring washers 28' on both sides rest via the O-rings on the associated ring-shaped ventilator side surface with a predetermined pressure force, and it may be worthwhile to provide a certain pre-bent shape here, so that in the assembled position shown in FIG. 7 the two spring washers 28' are located radially in a straight line in one plane, yet are capable of bringing to bear a desired pressure force of predetermined intensity.

It is also within the scope of the invention to provide more than merely one spring washer on both sides, as in the exemplary embodiment of FIG. 8; in that case, the many possible variants shown in FIGS. 1–7 in terms of the rubber inlay can be provided inside and adjacent to the spring washers.

In the exemplary embodiment of FIG. 8, in axial layers, both outer spring washers 34 and inner spring washers 16''' are provided on both sides, which then support narrower inner rubber gaskets 15'', somewhat as in the exemplary embodiment of FIG. 3; the various spring washers 34 and 16''' may also have different spring characteristics, so as to attain a desired combined pressure effect. The spring washers may be of a desired metal material, such as spring steel, or because of the short spring travel they may also be of conventional steel.

The effect of the noise damped ventilator combination embodied in accordance with the principles of the invention in terms of the noise level produced by an alternator of this kind is astonishing; measurements that are plotted in diagram form in FIGS. 11 and 12 show the differences clearly.

In the diagrams of FIGS. 11 and 12, the noise level course is plotted in dB(A) over the alternator speed n (the various values are intentionally given numerically, to enable making a quantitative determination), and for comparison the current emitted by the alternator is also plotted in amperes (A). FIG. 11 relates to a standard alternator, that is, one not having a noise damped ventilator system; In addition to a noise level indicated by an average curve course, the diagram shows that pronounced resonance peaks are also produced, in this case approximately at the alternator speed of n=3000 min$^{-1}$.

If this is compared with an alternator having an insulated ventilator system, that is, one embodied by the principles of the invention, as shown in FIG. 12, then it is clear that to an extent not only is the general curve course in the main speed range located below the mean curve course of the non-damped ventilator system, but the pronounced resonance peaks and excess-noise regions have largely disappeared as well. The subjective impression is even more remarkable than these diagrams show; a noise damped ventilator system according to the present invention runs quietly, without irritating noise emissions. Accordingly, the invention succeeds at one stroke in overcoming difficulties that until now have made satisfactory noise abatement in the ventilator area of an alternator impossible.

All the characteristics referred to in the description, recited in the ensuing claims and shown in the drawing may be essential to the invention either individually or in any combination with one another.

We claim:

1. Noise damped dynamo electric machine, especially vehicular type alternator, having
   a rotor shaft (11);
   a ventilator wheel (12, 12a) having a disk-shaped portion defining two oppositely located side surfaces, seated on the rotor shaft; and
   means for securing the ventilator wheel to the rotor shaft while attenuating noise generation comprising
   an axial clamping system, axially clamping the ventilator wheel to the rotor shaft having
   in axially aligned position,
   a material which is elastically pressure transferring while damping vibration transferred thereto located immediately adjacent a portion of at least one of the side surfaces of the ventilator wheel;
   a spring pressure element seated on the shaft; and
   a counter element located on said shaft and facing the other side surface of the ventilator wheel, said elements being secured to the shaft in axially defined positions to clamp the ventilator wheel between said elements with the elastically pressure transferring material between at least one of said elements and the ventilator wheel.

2. The machine of claim 1, wherein said axial clamping system comprises two spring pressure elements of elastic spring material, one of said spring pressure elements forming the counter element;
   and said elastically pressure transferring material is provided between each of said spring pressure elements and the ventilator wheel, said spring pressure elements and elastically transferring material being symmetrically located with respect to the side surfaces of the ventilator wheel at each side thereof and clamping the ventilator wheel in position on the rotor shaft.

3. The machine of claim 1, wherein said elastically pressure transferring and vibration damping material has the general form of a circular gasket and the spring pressure element has the general form of a disk or cup spring.

4. The machine of claim 1, wherein said clamped ventilator region (ventilator side surface) is, at least in the axial direction, connected with and held by solely the elastic pressure transferring material (rubber gaskets 15a, 14b, 15a', 15b', 22a, 22b; 23a, 23b; 25a, 25b; O-rings 32; 15'').

5. The machine of claim 2, wherein, the elastically pressure transferring and vibration damping extends radially only up to the radial dimension of the spring pressure elements (16, 1', 16'', 28, 28', 16''') and
   wherein two support disks (17) are provided, located on respective sides of the spring pressure elements remote from the ventilation wheel and extending up to a radial height of the spring pressure elements, which height is determined by expansion of the spring pressure elements upon the resilient clamping action, thereof, said support disks holding the thus-formed ventilator system together.

6. The machine of claim 5, wherein to provide axial spacing said ventilator bore (13) is seated on said rotor shaft (11) via an intermediate bushing (14), the axial width of which is greater than the axial width of the ventilator wheel, such that the spring pressure elements on both sides do not touch the clamped ventilator side surface at any point.

7. The machine of claim 2, wherein (FIG. 1) the elastically pressure transferring and vibration damping material comprises two rubber gaskets (15a, 15b) extending over the entire height of the clamped side surface of the ventilator wheel (12);

the spring pressure elements (16) are formed with recesses retaining said gaskets, and with peripheral inwardly protruding retainer rings (18), and wherein the spring pressure elements, in radial direction have tapering cross section and, become larger radially outwardly so that the rubber gaskets (15a, 15b) on both sides have a cross-sectional shape that conically tapers lightly toward the inside on the rotor shaft to assure contact over their entire surface area with the spring elements.

8. The machine of claim 7, wherein (FIG. 2) the rubber gaskets (15a', 15b') extending on both sides over only a portion of the radial height of the spring pressure elements (16') are positioned and retained in inwardly oriented annular grooves formed in the spring elements (16').

9. The machine of claim 1, wherein (FIG. 4) elastically pressure transferring and vibration damping material compises two rubber gaskets each (22a, 22b; 23a, 23b) offset radially in height and clamping predetermined portions of the ring-shaped ventilator wheel surface, said gaskets being inlaid on both sides in respective associated inner annular grooves (19, 24) of the spring pressure elements (16').

10. The machine of claim 1, wherein (FIG. 5) elastically pressure transferring and vibration damping material comprises two rubber gaskets (25a, 25b) extending over only a portion of the inner ring surface of the ventilator wheel and covered radially by the spring pressure elements, said gaskets being secured to inwardly oriented annular protrusions (26) of the spring pressure elements (16").

11. The machine of claim 10, wherein (FIG. 5) said rubber gaskets (25a, 25b) are vulcanized onto the peripheral inwardly oriented annular protrusions (26) of the spring pressure elements.

12. The machine of claim 1, wherein a bushing (14) is provided received by the inner bore of the ventilator wheel (12) and located on the shaft (11);

said bushing having a non-circular, preferably polygonal, for example rectangular or hexagonal outer circumference, and wherein a bore (13) in the ventilator wheel has a complementary shape.

13. The machine of claim 1, wherein (FIG. 6) the spring pressure elements (28) on both sides have distributed over their radial height inner recesses, grooves or notches for receiving at least part of the elastically pressure transferring and vibration damping material upon generation of axial pressure thereagainst.

14. The machine of claim 2, comprising (FIG. 6) annular protrusions (30) oriented toward one another on the inner bore of the spring pressure elements (28), said spring pressure elements being seated directly on the rotor shaft (11);

and rubber ring (31) located in a central bore of the ventilator wheel and on which said bore is radially seated, and wherein said elastically pressure transferring and vibration damping material comprises rubber inlays (27) located on both sides of the ventilator wheel having a large surface area and being of annular form, which axially receive the clamped wheel an.

15. The machine of claim 1, wherein (FIG. 7) the elastically pressure transferring and vibration damping material comprises two rubber O-rings (32);

the spring elements are formed with inner annular grooves or recesses, distributed over the radial height, receiving the O-rings; and a central rubber radial ring (31') is provided on which the ventilator wheel bore is supported with respect to the shaft (11) in such a manner that the clamped ventilator wheel region is retained and received on all sides, radially and axially, by rubber O-rings, which are subject to the pressure effect of the spring pressure elements (28') receiving said rubber rings in said grooves or recesses.

16. The machine of claim 1, wherein the elastically pressure transferring and vibration damping material comprises an elastomer other than rubber and having the characteristics of rubber, or rubber.

17. The machine of claim 1, wherein the spring pressure element comprises at least one of: a cup spring; a disk spring; a spring washer.

18. The machine of claim 2 wherein (FIG. 8) the axial clamping system comprises two outer spring pressure elements (34) and two inner spring pressure elements (16''') of elastic spring material having spring characteristics differing from those of the outer spring pressure elements;

and wherein the inner spring pressure elements (16''') engage said material which is elastically pressure transferring and vibration damping, and the outer spring pressure elements are located symmetrically with respect to axially outer surfaces of said inner spring elements.

19. The machine of claim 18 wherein said spring pressure elements differ from each other at least in one of the characteristics:
shape;
modulus of elasticity;
diameter.

20. The machine of claim 18, wherein at least one of said outer and inner spring pressure elements comprises at least one of:
a cup spring;
a disk spring;
a spring washer.

* * * * *